United States Patent [19]

Layport

[11] Patent Number: 5,191,790

[45] Date of Patent: * Mar. 9, 1993

[54] CARRIER

[75] Inventor: John L. Layport, Mattapoisett, Mass.

[73] Assignee: Sippican, Inc., Marion, Mass.

[*] Notice: The portion of the term of this patent subsequent to Sep. 10, 2008 has been disclaimed.

[21] Appl. No.: 756,832

[22] Filed: Sep. 9, 1991

Related U.S. Application Data

[63] Continuation of Ser. No. 543,691, Jan. 24, 1975, Pat. No. 5,046,359.

[51] Int. Cl.$^5$ .................. G01W 1/08; B63G 8/22; G01K 13/00
[52] U.S. Cl. ..................... 73/170.33; 73/300; 114/245; 374/136
[58] Field of Search ............ 73/170 A, 300; 114/245; 374/136; 441/33; 367/4

[56] References Cited

U.S. PATENT DOCUMENTS 3,605,492 9/1971 Stohrer ........................... 441/33

Primary Examiner—Gregory C. Issing
Attorney, Agent, or Firm—Testa, Hurwitz & Thibeault

[57] ABSTRACT

An assembly capable of being launched from a submarine to carry into seawater an element responsive to a property of the water to be measured, comprising a carrier member coupled to the element, a lifting body shaped to provide hydrodynamic lift, a tether for mechanically connecting the lifting body to the submarine, the lifting body and the tether being constructed and arranged so that the lifting body, when connected to a moving submarine, will move through the water at a distance above the submarine, a supply of electrically conductive cable connected to the element and stored at least in part by the lifting body for payout to accommodate movement of the submarine relative to the member and releasable coupling means for holding the member and the lifting body together during their launch from the submarine and there after releasing the lifting body from the member.

5 Claims, 3 Drawing Sheets

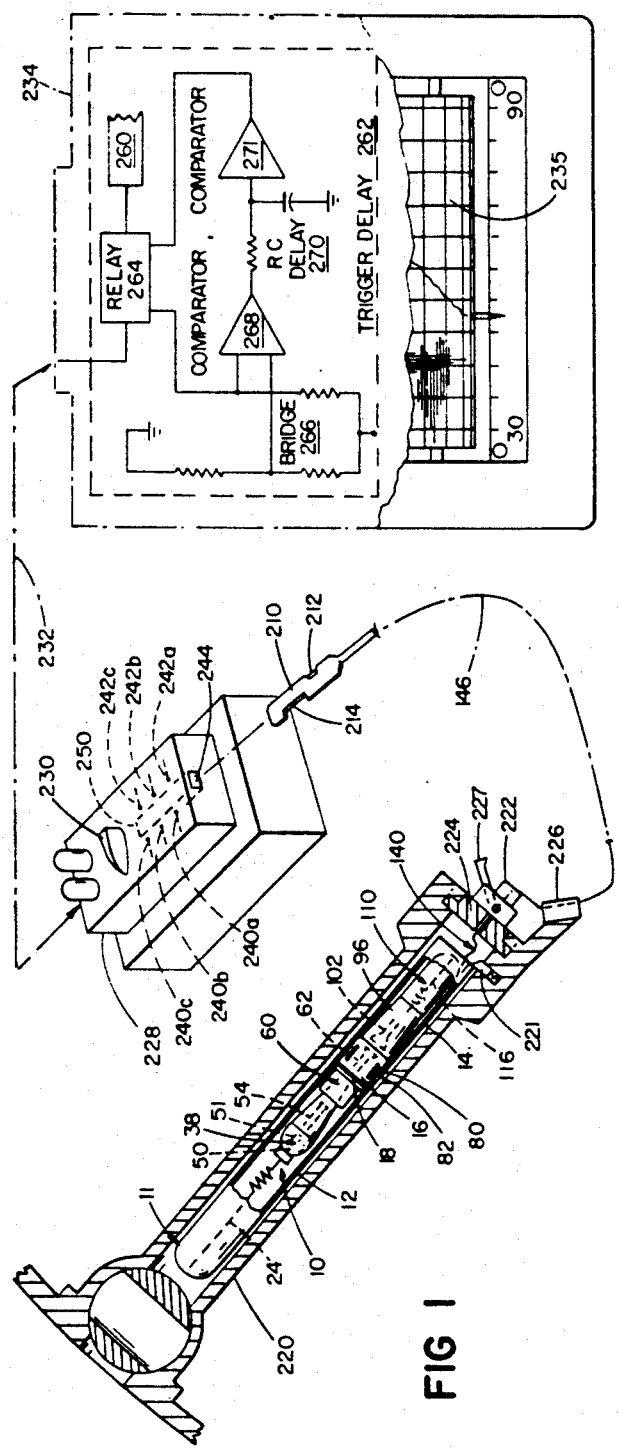

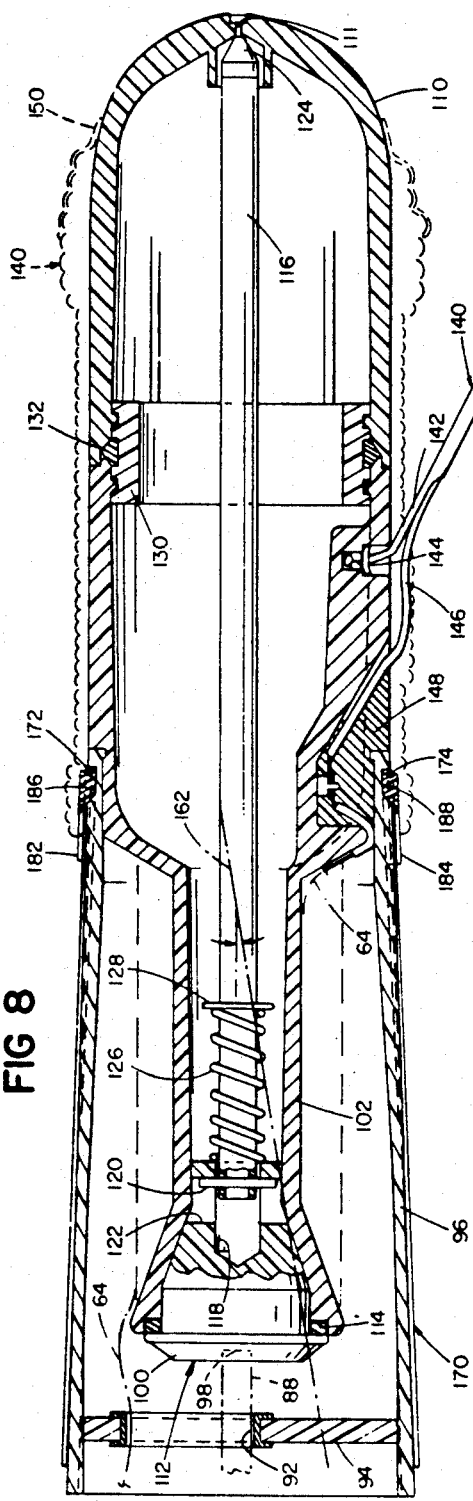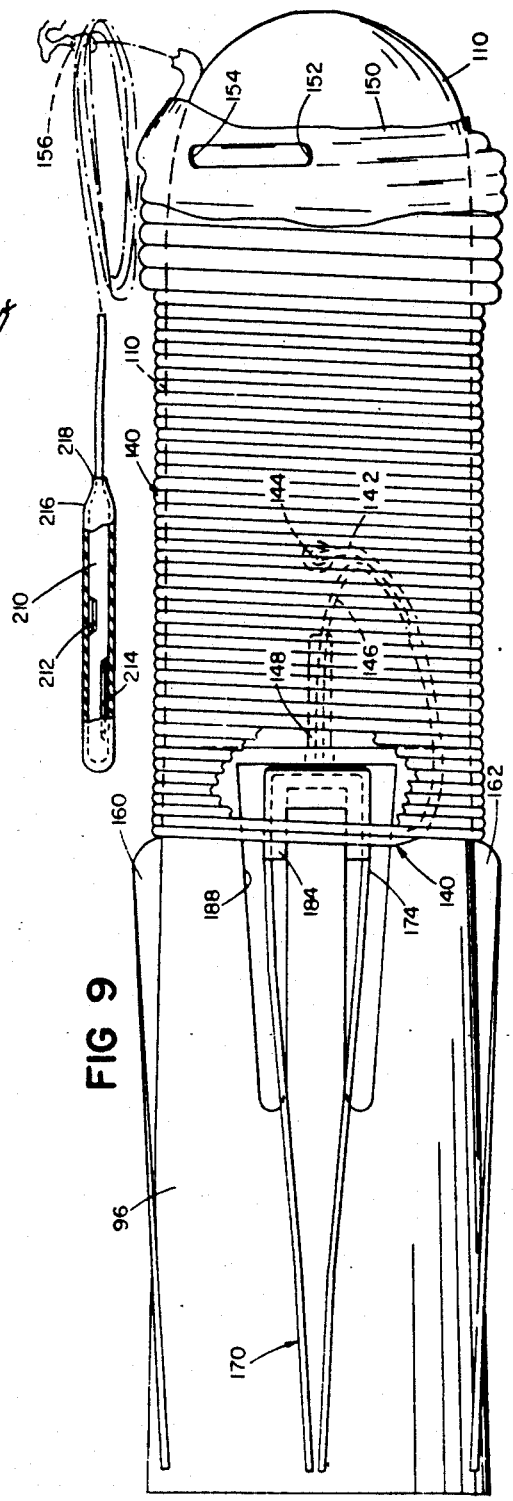

CARRIER

This is a continuation of copending application Ser. No. 05/543,691 filed on Jan. 24, 1975, now U.S. Pat. No. 5,046,359.

BACKGROUND OF THE INVENTION

This invention relates to submarine launched devices for measuring a property of seawater, e.g., a submarine bathythermograph (SSXBT).

Surface and air launched bathythermograph systems (XBTs) have been in use for some years. Relevant technology is known, and is described, e.g., in Campbell et al. U.S. Pat. No. 3,221,556; Cate U.S. Pat. No. Re. 27,103; and Costello U.S. Pat. No. 3,561,267. In general, a probe-carried thermister is connected in a bridge circuit through spooled wire arranged to pay out as the XBT descends and the launch vehicle continues its normal movement. Henricks et al. U.S. Pat. No. 3,408,867 discloses technology for manufacturing a suitable wire.

While much of the XBT technology is useful in SSXBT systems (and the disclosures in above-identified patents are accordingly hereby incorporated by reference), the latter present special problems, since, e.g., the probe must be carried to the surface before initiation of the measuring and recording cycle, and the wire must be kept free of the submarine propulsion mechanism and control surfaces. Efforts to design an SSXBT appear in Bixby U.S. Pat. No. 3,520,188; Francis U.S. Pat. No. Re. 27,335; Crist U.S. Pat. No. 3,524,347; and Stohrer U.S. Pat. No. 3,605,492.

SUMMARY OF THE INVENTION

The invention provides an improved assembly capable of being launched from the aft signal ejector of a submarine with only minor modification of the ejector breech door. The system overcomes the problems of interference with the submarine propulsion mechanism and control surfaces, and is reliable, easily manufactured and used, and makes possible highly accurate measurements under a variety of conditions.

In general the invention features an assembly capable of being launched from a submarine to carry into seawater an element responsive to a property of the water to be measured, comprising a carrier member coupled to the element, a lifting body shaped to provide hydrodynamic lift, a tether for mechanically connecting the lifting body to the submarine, the lifting body and the tether being constructed and arranged so that the lifting body, when connected to a moving submarine, will move through the water at a distance above the submarine, a supply of electrically conductive cable connected to the element and stored at least in part by the lifting body for payout to accommodate movement of the submarine relative to the member, and releasable coupling means for holding the member and the lifting body together during their launch from the submarine and thereafter releasing the lifting body from the member. In preferred embodiments the carrier member has a buoyancy chamber and is coupled to the element for ascent through the water, the member including pressure responsive means for initiating downward return of the element when the member reaches a predetermined reduced pressure zone in the water during the ascent the lifting body has a buoyancy chamber; the coupling means is held in operative position by coils of the tether which unwind during launch to permit release of the lifting body upon extension of the tether; the coupling means and the lifting body are surrounded by a housing wall, the housing being vented to permit water to surround the coupling means prior to release of the lifting body; both the lifting body and the carrier member include scuttle valve assemblies; the lifting body has a longitudinal axis, a pair of external wings, and an exterior shape having a rounded nose and a circular cross-section (except for the wings) transverse to the axis; the lifting body comprises a float having a nose at one end and a spool for storing the cable at the other end, and a skirt surrounding the spool; the carrier member comprises an elongated housing having the buoyancy chamber in its forward portion, a ballistically shaped probe carrying the element is mounted in the housing, and pressure responsive means are provided to hold the probe in the housing and seal the buoyancy chamber therein during the ascent, and to release the probe and open the chamber to flooding upon ascent to the reduced pressure zone; and a spool is mounted in the housing aft of the probe, a portion of the supply of cable being stored on the spool to pay out to accommodate vertical movement of the housing during the ascent while cable pays out from the lifting body to accommodate horizontal movement thereof, the spool and the housing having opposed flanges with sealing means therebetween to constitute the pressure responsive means, the housing being vented aft of the flanges to maintain the seal at elevated water pressure.

Other advantages and features of the invention will be apparent from the description and drawings herein of a preferred embodiment thereof.

BRIEF DESCRIPTION OF THE DRAWINGS

FIG. 1 is a partially diagrammatic, partially sectioned view of a system embodying the invention, with the SSXBT shown in the submarine aft signal ejector;

FIGS. 2 through 5 are diagrammatic views showing the system in successive stages of operation;

FIG. 8 is a full scale sectional view of the lifting body assembly; and

FIG. 9 is a full scale elevation of the lifting body of FIG. 8, partially broken away.

DESCRIPTION OF THE PREFERRED EMBODIMENT

Figure 6A:
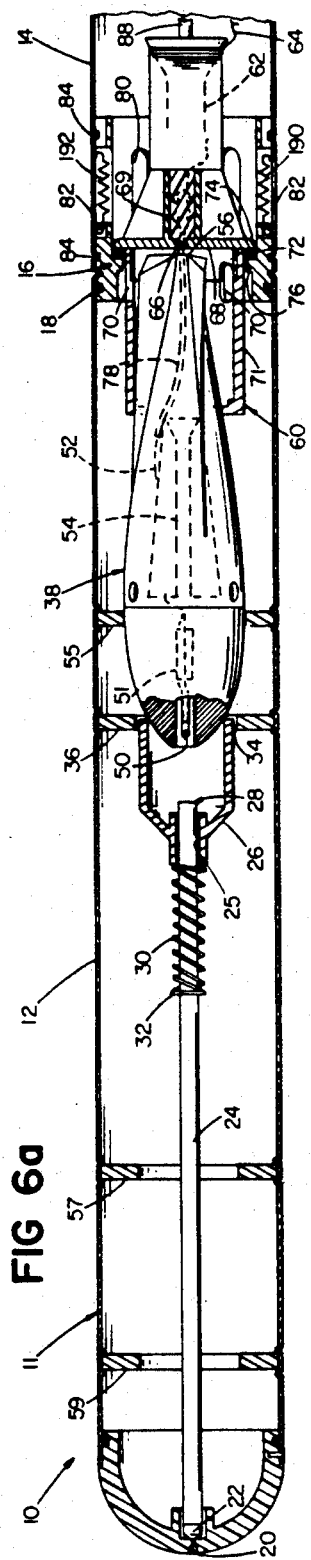
FIGS. 6a and 6b respectively show in sectional view overall fragments of the SSXBT.
Figure 6B:
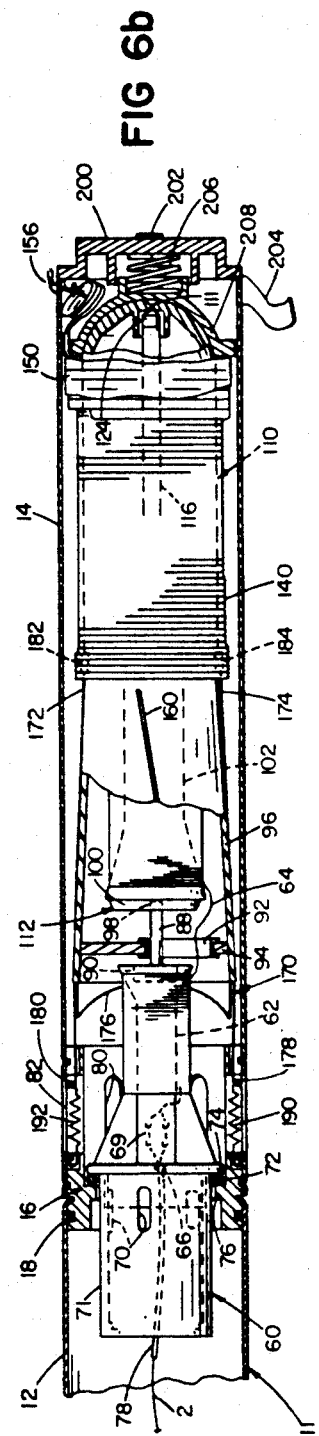
Figure 7:
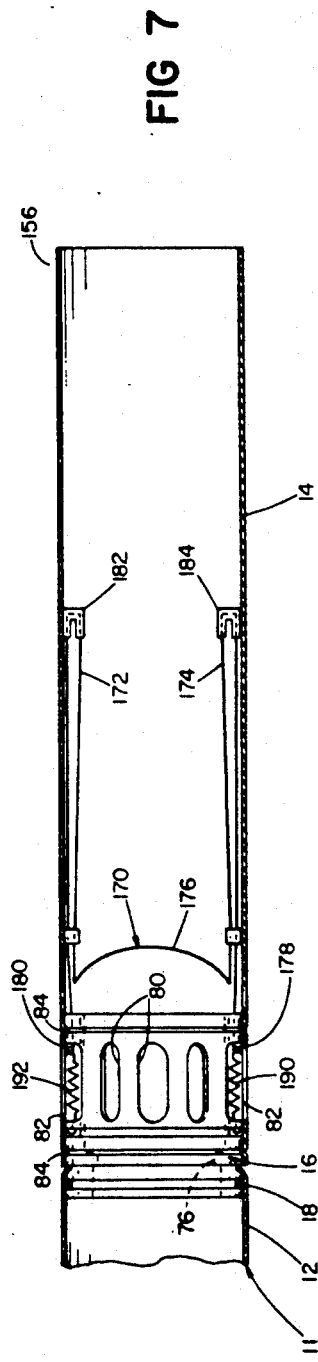
FIG. 7 is another fragmentary sectional view of the SSXBT.

In FIGS. 6a and 6b SSXBT assembly 10 is shown as stored prior to use, and has an outer housing 11 consisting of a forward tube 12 and an aft tube 14 each crimped to splice ring 16; O-ring 18 seals tube 12 to the ring.

The nose of tube 12 has an axial vent 20 sealed by tapered scuttle valve 22 mounted on one end of rod 24, the other end of which extends into sleeve 25 of hollow pusher 26 and is swaged at 28 to prevent its separation from the sleeve. Coil spring 30 surrounds rod 24 between sleeve 25 and retaining ring 32 fixed to the rod. The free end of pusher 26 is aligned in axial opening 34 of bulkhead 36 fixed inside tube 12, and seats on the nose of bathythermograph probe 38, with spring 30 compressed to force valve 22 into vent 20. The diameter of vent 20 is small enough so that water pressure at the intended maximum launch depth of the SSXBT will be insufficient to open vent 20 by overcoming spring 30.

Probe 38 is the general design disclosed in Campbell et al. U.S. Pat. No. 3,221,556 and, as shown in FIG. 6a, includes a thermister 50 and a sea electrode 51 connected to two conductor cable 52 wound on spool 54 for payout through the aft end 56 of the probe housing.

Bulkhead 36 closely surrounds the nose of probe 38 to protect the probe against axial shock, and a second bulkhead 55 similarly protects against radial shock. Bulkheads 57 and 59 provide additional strength. Tubes 12 and 14 are metal, except for the nose of tube 12 which is plastic.

Probe end 56 is received in sleeve 60 at the forward end of intermediate spool 62 on which is wound additional two wire cable 64. Cable 52 passes through opening 66 in the floor 68 of spool 62 and is electrically joined to cable 64 in potted cavity 69 in spool 62. Ports 70 are provided in the cylindrical wall 71 of sleeve 60, and O-ring 72 surrounds wall 71 adjacent spool flange 74. This intermediate spool and sleeve assembly extends through splice ring 16, and is positioned with flange 74 just aft of and aligned with flange 76 of the splice ring; O-ring 72 provides an axial seal between the flanges and, with O-ring 18, the potting in cavity 69, and valve 22, seals off the interior of tube 12. PVC spaghetti 78 protects the length of cable 52 between probe end 56 and cavity 69.

In the aft portion of splice ring 16 are a series of circumferentially spaced ports 80 aligned with similar ports 82 in tube 14, and the tube is staked (e.g., at 84) to the ring fore and aft of the ports.

Axial push rod 88 has a head 90 seated in the end of spool 62, extends through brass eyelet 92 in guide 94 near the forward end of tapered lifting body skirt 96, and has its end 98 seated in lifting body scuttle valve assembly cap 100. Cable 64 from the intermediate spool 62 passes through eyelet 92 and is wound around lifting body spool 102.

The lifting body assembly includes a float 110 with a vent 111 in its nose, and having as its aft portion spool 102, skirt 96 which has its small diameter end secured by adhesive to the float just forward of spool 102 and extends beyond the aft end of the float, and a scuttle valve assembly 112. The valve assembly includes cap 100 seated in the open end of spool 102 and seal thereto by O-ring 114, rod 116 held in cap recess 118 by pin 120 in elongated (to permit axial movement of the rod in the passage) slots 122, needle valve 124 at the other end of the rod, and coil spring 126 compressed between cap 100 and retaining ring 128 on the rod to hold valve 124 in vent 111.

Float 110 is made in two pieces held together and reinforced by splice ring 130, with bonding adhesive in cavity 132.

Tether 140 (fifty feet long) consists of a nylon tow cord 142 attached to float 110 at 144, and two conductor insulated steel cable 146 electrically connected to wire 64 in potted cavity 148. The tether is coiled around the float, with its last few turns held in place by rubber band 150 through openings 152 and 154 of which the tether passes. The free end of the tether is tied to tube 14 with string 156.

Parallel attitude control wings 160, 162 on opposite sides of skirt 96 form an angle of 10° with the horizontal (as seen in FIG. 8). FIGS. 8 and 9 are drawn to full scale for the particular embodiment disclosed, and show the preferred dimension and orientation of the wings, and the preferred location of the tether connection to the lifting body.

Wireform 170 is shaped to form two straight-legged elongated loops 172, 174; one leg of each loop is integral with semi-circular connector 176, and the other leg of each loop extends past connector 176 to terminate in a hook 178, 180. A tab 182, 184 is interlocked in each loop. The tabs fit in recesses 186, 188 at opposite sides of skirt 96, between wings 160, 162. The recesses have sloping floors and decrease in depth in the aft direction. Several turns of tether 140 are wound over tabs 182, 184 and loops 172, 174 to retain them in place against the skirt. The free legs of the loops extend through notches in splice ring 1 and springs 190, 192 connect hooks 178, 180 to a more forward portion of the splice ring, thereby drawing the lifting body assembly against the intermediate spool assembly.

Shipping plug 200 is held in place in the open aft end of tube 14 by clips 202, which are in turn secured by tape 204. Coil spring 206 is compressed between plug 200 and cup 208 (which protects the float wall and finish from damage by the spring), and holds the lifting body tightly against the intermediate spool during shipment and storage.

The free end of the tether cable 140 has an enlarged connector 210 with axially offset cutouts 212 and 214 on opposite sides, each cutout exposing a segment of one of the wire conductor in the cable. A waterproof, flexible boot 216 fits over connector 210 and is sealed to the cable at 218.

The SSXBT is designed for launching through the aft signal ejector of a submarine, after slight modification of the breech door. FIG. 1 shows the SSXBT inserted in the ejector 220, past spring biased detent 221 after removal of the shipping plug, spring 206 and cup 208. Tether 140 is threaded through a gland 22 provided in breech door 224, which gland can then be tightened around the tether to provide a seal. A wire grip 226 is attached to the tether outside the gland to isolate cable tension from connector box 228 to which conductor 146 is connected. Shear 227 is provided to sever the tether after completion of a use cycle. Box 228 has a lever operated switch 230 to complete the electrical connection, and a cable 232 leading to recorder 234. The recorder includes chart paper 235 which is advanced during operation to provide recordation of the temperature vs. depth relationship sensed by the SSXBT probe.

FIG. 1 shows the arrangement of connector 210 in box 228. Two sets 240a, b, c, and 242a, b, c, of opposing, spring-biased, retractable contacts are provided, respectively at opposite sides of channel 244 designed to receive connector 210 after removal of boot 216. Contacts 240a and 242a are connected in parallel, and one of them will fit into cutout 212 when the connector is inserted against stop 250. Similarly, either contacts 240b and c or 242b and c will fit in cutout 214. The provision of axially (of the cable connector) offset contacts and cutouts ensures connection with the proper polarity no matter how the connector is inserted.

To use the SSXBT after its placement in the signal ejector as described above, with the breech door closed and locked, and with the tether cable inserted into the connector box, lever 2 on the connector box is moved to complete the electrical circuit between the SSXBT and recorder 234, initiating a checking cycle during which a calibration temperature is recorded on chart paper 235. At the end of the checking cycle the system enters its launch mode, during which ejector tube 220 is flooded and the SSXBT is launched from the submarine through conventional operation of the signal ejector.

As the SSXBT rises from the submarine, the tether uncoils from lifting body float 110, breaking string 156 and pulling rubber band 150 off in the process, and quickly becomes fully extended.

As housing 11 continues upward (FIG. 2), by virtue of the buoyancy due to the air trapped in tube 12, the tether draws the lifting body out of tube 14, with tabs 182, 184 (which were released as the tether unwound) sliding back and out of skirt recesses 186, 188. Ports 80 and 82 ensure that the zone between intermediate spool flange 74 and the lifting body is at ambient water pressure, so that the intermediate spool is not drawn out of tube 12 as the lifting body separates, and similarly decoupling the lifting body from housing 11. With the aid of the hydrodynamic lift due to the shape of float 110 and skirt 96, and the buoyancy due to the air trapped in the float, the lifting body moves through the water above the submarine inclined at about 10°-30° to the horizontal, holding the tether free of the propeller screw and the aft control surfaces of the submarine, as shown in FIG. 3. Wings 160, 162 help to maintain the angle of inclination in the desired range. Water pressure at the submarine depth (e.g., 50-10 feet) keeps valve cap 100 seated and sealed in spool 102, but is insufficient to unseal valve 124 from vent 111. During this ascent phase, wire 64 pays out from spool 62 in response to vertical movement of housing 11 relative to the lifting body, and wire 64 pays out from spool 102 in response to horizontal movement of the submarine-drawn lifting body through the water, so that the wire once payed out is not drawn through the water, minimizing the forces applied to the wire and permitting use of a very fine gauge.

Water pressure is sufficient to maintain the seal at O-ring 72 until housing 11 reaches the surface, at which point the intermediate spool and probe drop out of tube 12, as shown in FIG. 4. When the probe electrode 51 contacts the water the electrical circuitry in the SSXBT system is triggered to initiate a measurement and recording cycle during which the temperature profile sensed by the thermister as the probe descends to the bottom is recorded on the chart. The intermediate spool slowly follows the probe to the bottom (FIG. 5). As probe 38 falls, wire 52 unspools at a rate equal to the probe's speed of descent, thereby reducing wire tension.

When probe 38 drops out of housing 11 the spring force on scuttle valve rod 24 is released, opening vent 20 to permit escape of air as tube 12 fills with water. The flooded housing then drops to the bottom (FIG. 5).

Upon completion of the measurement and recording cycle, shear 227 is operated to sever the tether wire, and the buoyancy in float 110 causes the lifting body to rise toward the water surface. At about 15 feet from the surface the reduced water pressure is insufficient to maintain the seal at O-ring 114, valve 124 is released, and air escapes through vent 111 as float 110 fills with water through its aft end. Cap 100 is sufficiently heavy to keep the nose of the float up (so that air is not trapped in the partially flooded float) until the float is fully flooded and drops to the bottom.

An overall diagram of the electromechanical system appears in FIG. 1. Bridge circuit 260 includes the probe thermister and is preferably the lines described in said U.S. Pat. No. Re. 27,103. Other details of the circuitry in recorder 234 and connector box 228 may be as desired, and form no part of the present invention. The trigger delay circuit 262 prevents premature initiation of the measuring and recording cycle. As in the conventional surface launched XBT system, one version of which is described in said U.S. Pat. No. 3,221,556 (the currently used version is available from The Sippican Corporation, Marion, Mass.), the circuitry is designed to initiate the measuring and recording cycle in response to a signal produced by contact of the probe with the water. When the SSXBT is flooded in the submarine signal ejector tube there is immediate contact of the wire on spools 62 and 102 with the water, producing transient currents due to capacitative discharge which would trigger the measuring and recording cycle if not suppressed. Then, when the probe is first exposed to the water as housing 11 reaches the surface, 1.4 seconds is required for the probe to actually discharge from the housing and turn over to begin its descent. The trigger delay circuit includes a relay 264 which during launch disconnects the recorder from the rest of the system, and a second bridge circuit 266 employing seawater return as a leg. This bridge feeds a comparator 268 which in turn drives an RC delay circuit 270. When the comparator 268 detects a seawater return path, the RC circuit charges. After 1.4 seconds of charging, a second comparator 271 with built-in hysteresis turns off the disconnect relay, instantly connecting the recorder bridge circuitry to the probe and triggering the measuring and recording cycle.

Other embodiments are within the following claims.

I claim:

1. An assembly capable of being launched from a submarine to carry into seawater an element responsive to a property of the water to be measured by a measurement circuit, comprising a carrier member coupled to said element,
a lifting body,
a tether for connecting said lifting body to said submarine to pull said lifting body through the water when said submarine is moving,
a supply of conductive cable connected to said element for connecting said element in said measurement circuit,
releasable coupling means for holding said member and said lifting body together during their launch from the submarine and thereafter releasing said lifting body from said member,
means for storing said cable for payout between said lifting body and said member after release of said lifting body from said member, to permit movement of said member relative to said lifting body while said lifting body is being pulled through the water by said submarine via said tether,
said lifting body having means operable during said payout to maintain said lifting body at a distance above said submarine.

2. The assembly of claim 1, wherein said lifting body is shaped to provide hydrodynamic lift.

3. The assembly of claim 1, wherein said lifting body is buoyant.

4. The assembly of claim 2, wherein said lifting body is buoyant.

5. The assembly of claim 1, wherein said cable is electrically conductive.

* * * * *